(12) United States Patent
Cha et al.

(10) Patent No.: US 11,657,712 B2
(45) Date of Patent: May 23, 2023

(54) METHOD AND SYSTEM FOR SEARCHING FOR ROUTE USING ROAD-SHOULDER PARKING STATE INFORMATION

(71) Applicants: Hyundai Motor Company, Seoul (KR); Kia Motors Corporation, Seoul (KR)

(72) Inventors: Yeon Joo Cha, Gyeonggi-do (KR); Tae Ho Lee, Gyeonggi-do (KR); In Ho Yoon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 14 days.

(21) Appl. No.: 16/935,595

(22) Filed: Jul. 22, 2020

(65) Prior Publication Data

US 2021/0174679 A1 Jun. 10, 2021

(30) Foreign Application Priority Data

Dec. 6, 2019 (KR) .................... 10-2019-0161992

(51) Int. Cl.
*G08G 1/0968* (2006.01)
*G06T 7/70* (2017.01)
(52) U.S. Cl.
CPC ........ *G08G 1/096844* (2013.01); *G06T 7/70* (2017.01); *G08G 1/096816* (2013.01); *G06T 2207/30252* (2013.01)

(58) Field of Classification Search
CPC ........ G08G 1/096844; G08G 1/096816; G06T 7/70; G06T 2207/30252
See application file for complete search history.

(56) References Cited

U.S. PATENT DOCUMENTS

| 7,418,372 | B2* | 8/2008 | Nishira | ................ | B60K 31/047 |
| | | | | | 703/2 |
| 7,440,840 | B2* | 10/2008 | Tsukamoto | ..... | B60W 30/18054 |
| | | | | | 701/110 |
| 10,535,256 | B1* | 1/2020 | Lim | .................... | G01C 21/3415 |
| 10,872,431 | B2* | 12/2020 | Stein | ..................... | G01B 11/14 |
| 2006/0111822 | A1* | 5/2006 | Simon | ................ | B60R 25/1003 |
| | | | | | 701/468 |
| 2007/0257819 | A1* | 11/2007 | Manor | ..................... | G08G 1/01 |
| | | | | | 340/933 |
| 2016/0257342 | A1* | 9/2016 | Ueda | .................... | B62D 15/026 |
| 2017/0132929 | A1* | 5/2017 | Mays | ................... | G08G 1/0141 |
| 2017/0168502 | A1* | 6/2017 | Gordon | ................. | B60K 28/14 |
| 2017/0309172 | A1* | 10/2017 | Linder | ................ | G08G 1/0133 |
| 2018/0050692 | A1* | 2/2018 | Kim | ..................... | G05D 1/0212 |

(Continued)

*Primary Examiner* — Thomas Ingram
(74) *Attorney, Agent, or Firm* — Fox Rothschild LLP

(57) ABSTRACT

A method and system for searching for a route using road-shoulder parking state information is provided for a vehicle operating in conjunction with a server via a wireless communication network. The method includes identifying vehicles stopped on a shoulder of a road by analyzing an image captured by a camera and determining a vehicle to be reported as being stopped on the shoulder of the road among the identified vehicles stopped on the shoulder of the road. A road-shoulder stop report message is generated corresponding to the determined vehicle to be reported as being stopped on the shoulder of the road and the road-shoulder stop report message is transmitted to the server.

10 Claims, 8 Drawing Sheets

(56) References Cited

U.S. PATENT DOCUMENTS

| | | | |
|---|---|---|---|
| 2019/0159166 A1* | 5/2019 | Aggarwal | H04W 4/12 |
| 2020/0208998 A1* | 7/2020 | Xiang | G01C 21/3461 |
| 2020/0231151 A1* | 7/2020 | Aoki | B60W 30/18159 |

* cited by examiner

US 11,657,712 B2

METHOD AND SYSTEM FOR SEARCHING FOR ROUTE USING ROAD-SHOULDER PARKING STATE INFORMATION

CROSS-REFERENCE TO RELATED APPLICATION

This application claims the benefit of priority to Korean Patent Application No. 10-2019-0161992, filed on Dec. 06, 2019, the entire contents of which are incorporated herein by reference.

TECHNICAL FIELD

The present disclosure relates to vehicle route guidance, and more particularly, to a technology for determining a lane state based on information about vehicles parked on the shoulder of a road and searching for an optimal route based on an outcome of the determination, the information being collected suing a vehicle camera while the vehicle is being driven.

BACKGROUND

In a conventional route guidance service through a Connected Car Service (CCS) center, the center searches for an optimal/recommended/bypass route based on information about vehicles traveling on a road, traffic light information, the number of lanes on the road, the speed limit, and road event information including, for example, accident information, road control information, and the like, and the center provides, to a corresponding vehicle, information about a detected route.

However, in the case of city driving or non-signal road driving, a number of vehicles may be parked on the last or outermost lane (e.g., the shoulder) of a road, and therefore a situation in which a corresponding lane is unavailable may occur frequently. For example, in many cases, due to a number of vehicles parked on the last lane of a two-lane road, only the first lane is used for driving.

The conventional route guidance service using the connected car service center (or server) does not consider vehicles parked on the shoulder of a road at all. Therefore, the route guidance service has problems in that it takes more time to reach a destination than expected and a calculated optimal route requires more time than another route.

SUMMARY

The present disclosure \provides a method and system for searching for a route using road-shoulder parking state information. Another aspect of the present disclosure provides a route search method and system using road-shoulder parking state information, in which the method and system determines a lane state based on information about vehicles parked on the shoulder of a road and searches for an optimal route based on an outcome of the determination, the information being collected using a vehicle camera while the vehicle is being driven.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a method for searching for a route using road-shoulder parking state information in a vehicle operating in conjunction with a server via a wireless communication network may include identifying vehicles stopped on a shoulder of a road by analyzing an image captured by a camera while the vehicle is being driven, determining a vehicle to be reported as being stopped on the shoulder of the road among the identified vehicles stopped on the shoulder of the road, and generating a road-shoulder stop report message that corresponds to the determined vehicle to be reported as being stopped on the shoulder of the road and transmitting the road-shoulder stop report message to the server.

In an exemplary embodiment, the identifying of the vehicles stopped on the shoulder of the road may include detecting a vehicle stopped on a left or right shoulder of the road by analyzing an image captured by a front camera and calculating a first coordinate point representing a position of the detected vehicle, calculating a second coordinate point representing a position of the detected vehicle by analyzing an image captured by a rear camera, and determining a vehicle stopped on the shoulder of the road by comparing the first coordinate point and the second coordinate point.

In addition, the determining of the vehicle stopped on the shoulder of the road by comparing the first coordinate point and the second coordinate point may include determining the detected vehicle to be the vehicle stopped on the shoulder of the road, when the first coordinate point and the second coordinate point match each other and determining the detected vehicle to be a vehicle traveling on the shoulder of the road, when the first coordinate point and the second coordinate point do not match each other. In an exemplary embodiment, the determining of the vehicle to be reported as being stopped on the shoulder of the road may include calculating an occupancy rate at which the vehicle determined to be stopped on the shoulder of the road occupies a last or outermost lane and determining a vehicle to be reported as being stopped on the shoulder of the road by comparing the calculated occupancy rate and a predetermined reference value.

The determining of the vehicle to be reported as being stopped on the shoulder of the road by comparing the calculated occupancy rate and the predetermined reference value may include determining the corresponding vehicle stopped on the shoulder of the road to be a vehicle to be reported as being stopped on the shoulder of the road, when the calculated occupancy rate is greater than or equal to the reference value and excluding the corresponding vehicle stopped on the shoulder of the road from a vehicle to be reported as being stopped on the shoulder of the road, when the calculated occupancy rate is less than the reference value.

The road-shoulder stop report message may include at least one of information regarding time when stop is identified, road information, lane information, or position information that corresponds to the determined vehicle to be reported as being stopped on the shoulder of the road. In addition, based on the road-shoulder stop report message collected from a different vehicle, the server may be configured to monitor a driving state change for each node section included in an initial route found to correspond to the vehicle, and based on an outcome of the monitoring, the server may be configured to determine whether to re-search for a route for the vehicle.

Further, the server may be configured to determine that re-search for a route for the vehicle is required, when a driving impossibility ratio of the node sections included in the initial route exceeds a predetermined threshold value, or estimated time of arrival at a destination that is calculated again based on the driving state change is changed at a predetermined ratio or more. The server may be configured to monitor a driving state change for each corresponding node section using only a road-shoulder stop report message collected from a different vehicle within a predetermined driving time radius at the current position of the vehicle.

According to another aspect of the present disclosure, a method for searching for a route using road-shoulder parking state information in a server operating in conjunction with a vehicle via a wireless communication network may include searching for an initial route to a destination set by a user, based on collected road-shoulder stop information and transmitting the found initial route to the vehicle, receiving at least one road-shoulder information report message that corresponds to the initial route from a different vehicle during travel to the destination, monitoring a driving state change for each node section included in the initial route, based on the road-shoulder information report message, re-searching for a route from a current position of the vehicle to the destination, based on an outcome of the monitoring, and transmitting, to the vehicle, the route found again.

In an exemplary embodiment, the road-shoulder stop report message may include at least one of information regarding time when stop is identified, road information, lane information, or position information that corresponds to a corresponding vehicle stopped on a shoulder of a road. In addition, the server may be configured to determine that re-search for a route for the vehicle is required, when a driving impossibility ratio of the node sections included in the initial route exceeds a predetermined threshold value, or estimated time of arrival at the destination that is calculated again based on the driving state change is changed at a predetermined ratio or more. The server may be configured to monitor the driving state change for each corresponding node section, based on the road-shoulder stop report message collected from the different vehicle within a predetermined driving time radius at the current position of the vehicle.

According to another aspect of the present disclosure, a vehicle may include a camera, a vehicle identification device configured to detect vehicles stopped on a shoulder of a road by analyzing an image capture by the camera while the vehicle is being driven, a road-shoulder occupancy rate calculation device configured to calculate an occupancy rate at which the identified vehicle stopped on the shoulder of the road occupies a last or outermost lane, a driving impossibility determination device configured to determine a vehicle to be reported as being stopped on the shoulder of the road, based on the calculated occupancy rate, a report message generation unit configured to generate a road-shoulder stop report message that corresponds to the determined vehicle to be reported as being stopped on the shoulder of the road, and a wireless communication device configured to transmit the road-shoulder stop report message to a server via a wireless communication network.

In an exemplary embodiment, the camera may include a front camera and a rear camera, and the vehicle identification device may include a device configured detect a vehicle stopped on a left or right shoulder of the road by analyzing an image captured by the front camera and calculate a first coordinate point representing a position of the detected vehicle, a device configured to calculate a second coordinate point representing a position of the detected vehicle by analyzing an image captured by the rear camera, and a device configured to determine a vehicle stopped on the shoulder of the road by comparing the first coordinate point and the second coordinate point.

The vehicle identification device may be configured to determine the detected vehicle to be the vehicle stopped on the shoulder of the road, when the first coordinate point and the second coordinate point match each other, and the vehicle identification device may be configured to determine the detected vehicle to be a vehicle traveling on the shoulder of the road, when the first coordinate point and the second coordinate point do not match each other. The driving impossibility determination device may be configured to determine the corresponding vehicle to be a vehicle to be reported as being stopped on the shoulder of the road, when the occupancy rate calculated to correspond to the vehicle determined to be stopped on the shoulder of the road is greater than or equal to a predetermined reference value, and the driving impossibility determination device may be configured to exclude the corresponding vehicle from a vehicle to be reported as being stopped on the shoulder of the road when the occupancy rate is less than the reference value.

In particular, the road-shoulder stop report message may include at least one of information regarding time when stop is identified, road information, lane information, or position information that corresponds to the determined vehicle to be reported as being stopped on the shoulder of the road. In an exemplary embodiment, based on the road-shoulder stop report message collected from a different vehicle, the server may be configured to monitor a driving state change for each node section included in an initial route found to correspond to the vehicle, and based on an outcome of the monitoring, the server may be configured to determine whether to re-search for a route for the vehicle. The server may be configured to determine that re-search for a route for the vehicle is required, when a driving impossibility ratio of the node sections included in the initial route exceeds a predetermined threshold value, or estimated time of arrival at a destination that is calculated again based on the driving state change is changed at a predetermined ratio or more.

The technical problems to be solved by the present disclosure are not limited to the aforementioned problems, and any other technical problems not mentioned herein will be clearly understood from the following description by those skilled in the art to which the present disclosure pertains.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
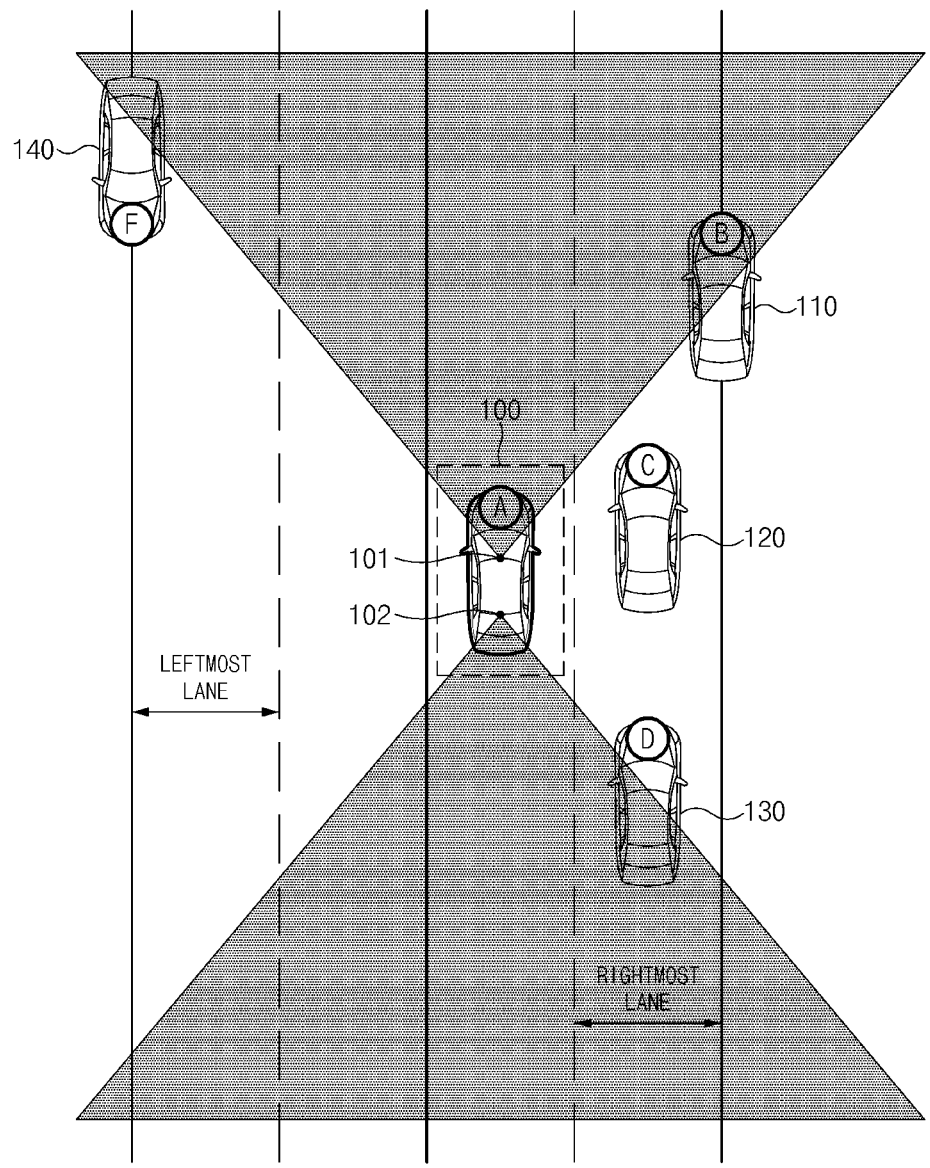
FIG. 1 is a view illustrating a method of detecting vehicles parked/stopped on the shoulder of a road by using front/rear vehicle cameras according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, exemplary embodiments of the present disclosure will be described in detail with reference to FIGS. 1 to 6. FIG. 1 is a view illustrating a method of detecting vehicles parked/stopped on the shoulder of a road by using front/rear vehicle cameras according to an exemplary embodiment of the present disclosure. Notably, a controller may be configured to operate the various components described herein below.

Referring to FIG. 1, vehicle A 100 (e.g., a first vehicle) may be configured to capture images of vehicles located on the shoulders on left/right sides of a travel lane using a front camera 101 or other imaging device. For example, through analysis of the images captured by the front camera 101, vehicle A 100 may be configured to detect vehicle B 110 (e.g., a second vehicle), vehicle C 120 (e.g., a third vehicle), vehicle D 130 (e.g., a fourth vehicle), and vehicle F 140 (e.g., a fifth vehicle) located on the left/right shoulders and may be configured to calculate a first coordinate point of each of the detected vehicles.

Through analysis of images captured by a rear camera 102 during travel, vehicle A 100 may be configured to calculate a second coordinate point of each of the vehicles detected using the front camera 101. Based on whether the first coordinate point and the second coordinate point of each detected vehicle match each other, vehicle A 100 may be configured to determine whether the corresponding vehicle is in a stopped state. Vehicle A 100 may be configured to calculate occupancy rates at which the vehicles identified to be stopped occupy the leftmost and rightmost lanes (e.g., the outermost lanes on the road). Vehicle A 100 may be configured to determine vehicles having an occupancy rate greater than or equal to a predetermined reference value, for example, about 30% to be vehicles to be reported as being stopped on the shoulders.

Referring to FIG. 1, vehicle C 120 and vehicle D 130 may be included in the vehicles to be reported as being stopped on the shoulders, and vehicle B 110 and vehicle F 140 may be excluded from the vehicles to be reported as being stopped on the shoulders. Vehicle A 100 may be configured to transmit, to a CCS server via a wireless communication network, information about the vehicles to be reported as being stopped on the shoulders, that is, a road-shoulder state report message that will be described below. The CCS server may be configured to monitor a road state in real time based on the road-shoulder state report message, dynamically search for a route based on an outcome of the monitoring, and provide the detected route to the corresponding vehicle.

Figure 2:
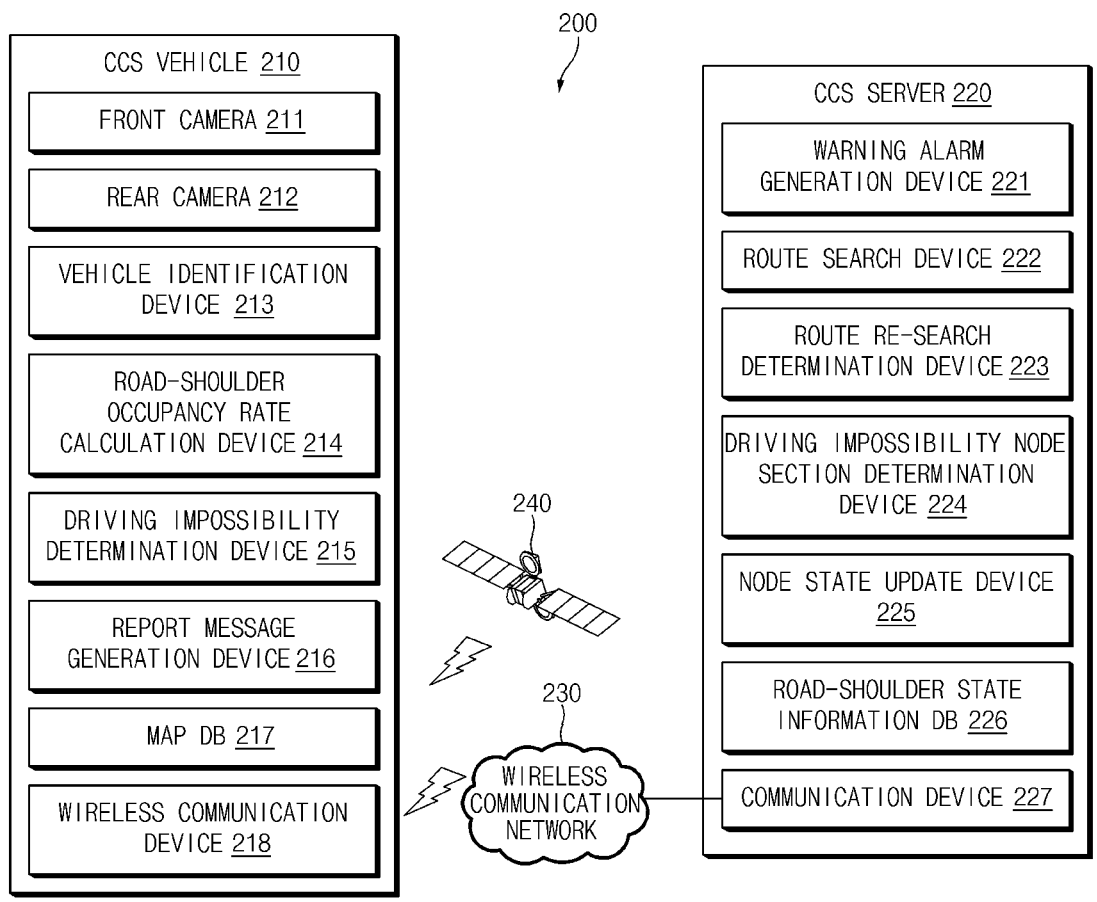
FIG. 2 is a view illustrating a route search system according to an exemplary embodiment of the present disclosure.

FIG. 2 is a view illustrating a route search system according to an exemplary embodiment of the present disclosure. Referring to FIG. 2, the route search system 200 may include a CCS vehicle 210, a CCS server 220, a wireless communication network 230, and a positioning satellite 240.

The CCS vehicle 210 may include a front camera 211, a rear camera 212, a vehicle identification device 213, a road-shoulder occupancy rate calculation device 214, a driving impossibility determination device 215, a report message generation device 216, a map database 217, and a wireless communication device 218. Each of these components may be operated by a specifically programmed controller within the CCS vehicle. The front camera 211 may be configured to capture images of front left/right lanes relative to a travel lane of the CCS vehicle 210. The rear camera 212 may be configured to capture images of rear left/right lanes relative to the travel lane of the CCS vehicle 210.

The vehicle identification device 213 may be configured to identify vehicles stopped on the shoulders by analyzing the images captured by the front camera 211 and the rear camera 212. In an exemplary embodiment, the vehicle identification device 213 may be configured to calculate first and second coordinate points of each of the vehicles located on the shoulders, by analyzing the images captured by the front and rear cameras 211 and 212 and determine vehicles, the calculated first and second coordinate points of which match each other, to be stopped vehicles.

The road-shoulder occupancy rate calculation device 214 may be configured to calculate occupancy rates at which the vehicles determined to be stopped occupy the leftmost and rightmost lanes. The driving impossibility determination device 215 may be configured to identify vehicles having an occupancy rate greater than or equal to a predetermined reference value and determine the identified vehicles to be vehicles to be reported as being stopped on the shoulders. The report message generation device 216 may be configured to generate a road-shoulder state report message that includes information about the road on which the vehicles to be reported as being stopped on the shoulders are located, information about the lanes on which the vehicles are located, information about the positions (e.g., coordinate points) of the vehicles, information about time when the vehicles are detected to be stopped, and the like. In particular, the information about the road and the lanes may be obtained with reference to detailed map information stored in the map database 217 for the coordinate points at which the vehicles to be reported as being stopped on the shoulders are located.

The wireless communication device 218 may be configured to transmit the road-shoulder state report message to the CCS server 220 via the wireless communication network 230. Furthermore, the wireless communication device 218 may be configured to obtain information about the current position of the CCS vehicle 210 and the current time by receiving a positioning signal from the positioning satellite 240 and transmit the obtained position and time information to the report message generation device 216.

The CCS server 220 may include a warning alarm generation device 221, a route search device 222, a route re-search determination device 223, a driving impossibility node section determination device 224, anode state update device 225, a road-shoulder state information database 226, and a communication device 227. The communication device 227 may be configured to receive the road-shoulder state report message. The road-shoulder state information database 226 may be configured to store road-shoulder state information for each node section.

Additionally, the node state update device 225 may be configured to update the road-shoulder state information for each node section, which is stored in the road-shoulder state information database 226, based on the road-shoulder state report message. The driving impossibility node section determination device 224 may be configured to determine whether a corresponding node section is available, based on the current road-shoulder state information for each node section. When a driving state of a specific node section on a driving route is changed by the driving impossibility node section determination device 224, the route re-search determination device 223 may be configured to determine whether to re-search for a route, based on the corresponding change.

In an exemplary embodiment, the route re-search determination device 223 may be configured to determine whether driving impossibility ratios of node sections included in an initial route exceed a threshold value or estimated time of arrival at a destination that is calculated again based on a driving state change is changed at a predetermined ratio or more. In response to determining that the driving impossibility ratios exceed the threshold value or the estimated time of arrival is changed at the predetermined ratio or more, the route re-search determination device 223 may be configured to determine that re-search for a bypass route or an optimal route from the current position to the destination is required.

The route search device 222 may be configured to search for an optimal route to a destination set for each vehicle. When re-search for a route is required based on a driving state change, the route search device 222 may be configured to search for a bypass route or a new optimal route. When the driving state is changed, the waning alarm generation device 221 may be configured to generate a waning alarm message that includes the corresponding driving state change and may be configured to transmit the waning alarm message to the corresponding CCS vehicle.

Figure 3A:
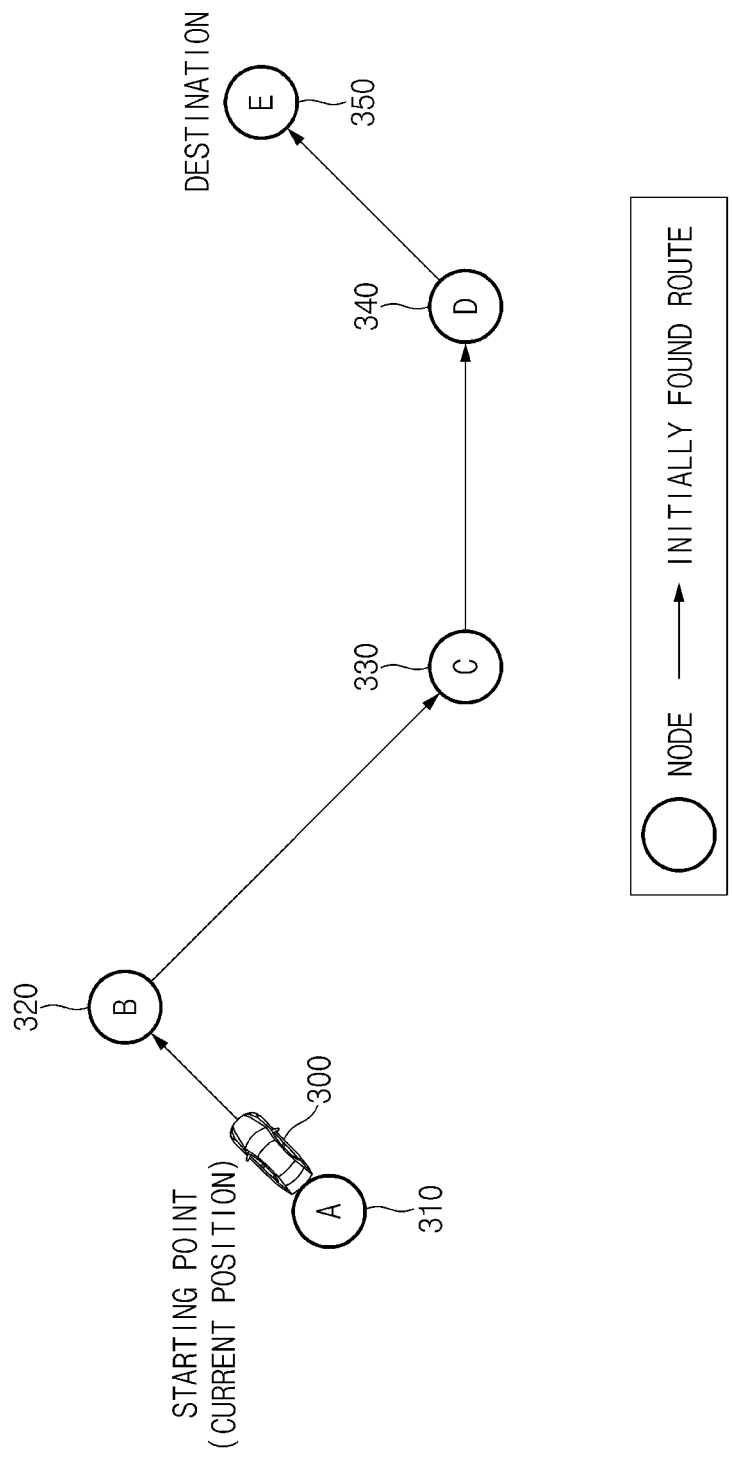
FIGS. 3A to 3C are views illustrating a route search method using road-shoulder parking state information according to an exemplary embodiment of the present disclosure.
Figure 3B:
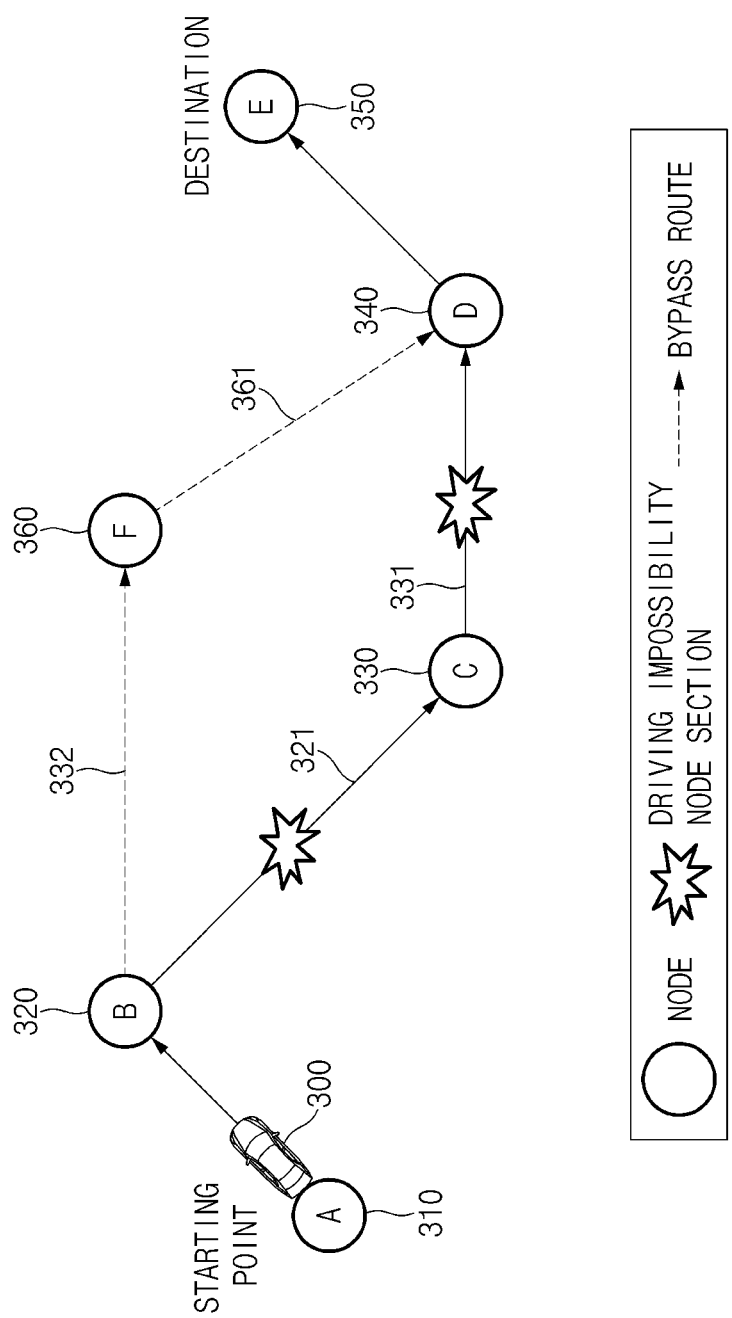
Figure 3C:
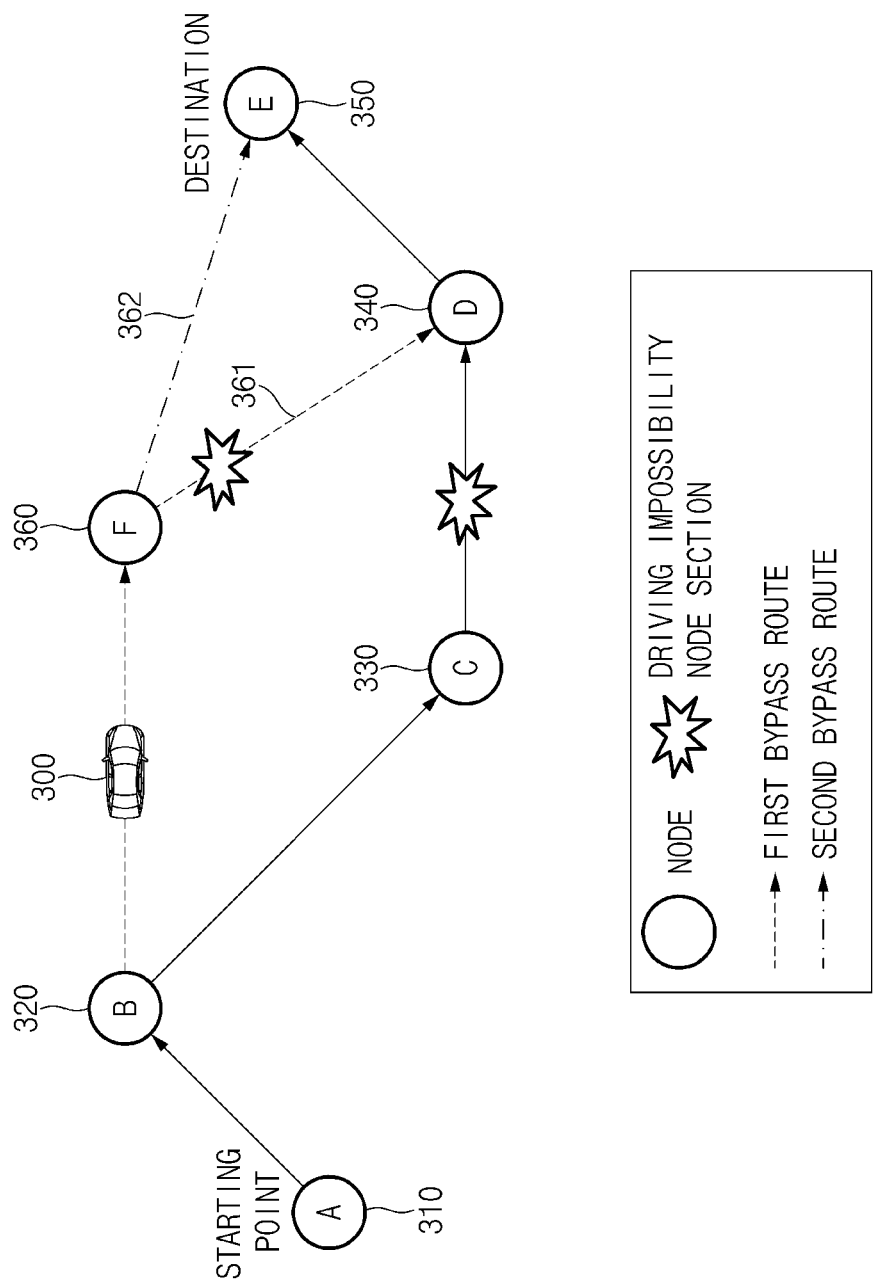

FIGS. 3A to 3C are views illustrating a route search method using road-shoulder parking state information according to an exemplary embodiment of the present disclosure. Referring to FIG. 3A, a driver of a CCS vehicle 300 may be configured to set a destination using a navigation device included in the vehicle and may be configured to request a CCS server to search for a route. The CCS server may be configured to search for an optimal route from node A 310, which is a starting point, to node E 350 set to the destination and provide the optimal route to the CCS vehicle 300. For example, it may be assumed that the route initially detected by the CCS server is a route from node A 310 to node E 350 via node B 320, node C 330, and node D 340. The CCS server may be configured to search for the optimal route, based on collected road-shoulder stop information as well as traffic, road event information, traffic light information, road type, and speed limit.

Referring to FIG. 3B, while the CCS vehicle 300 moves from node A 310 to node B 320, node section BC 321 and node section CD 331 may be changed to driving impossibility node sections. In an exemplary embodiment, when the ratio of the driving impossibility node sections to the total driving node sections exceeds a reference value, for example, about 30%, the CCS server may be configured to start a route re-search procedure. In the exemplary embodiment of FIG. 3B, the ratio of the driving impossibility node sections to the total driving node sections is two fourths, that is, about 50%.

The CCS server may be configured to search for a bypass route, based on road-shoulder parking/stopping information collected up to now. For example, the CCS server may be configured to determine node section BF 322 and node section FD 361 as a route that bypasses node section BC 321 and node section CD 331.

Referring to FIG. 3C, while the CCS vehicle 300 moves from node B 320 to node F 360 depending on the route re-search result of FIG. 3B, node section FD 361 may be changed from a driving possibility node to a driving impossibility node. In particular, when the ratio of the driving impossibility node section to the total driving node sections remaining to the destination exceeds the reference value, for example, about 30%, the CCS server may be configured to start a route re-search procedure. In the exemplary embodiment of FIG. 3C, the ratio of the driving impossibility node section to the total driving node sections is one thirds, that is, about 33%. The CCS server may be configured to re-search for a bypass route, based on road-shoulder parking/stopping information collected up to now. For example, the CCS server may be configured to determine node section FE 362 as a route that bypasses node section FD 361.

Figure 4:
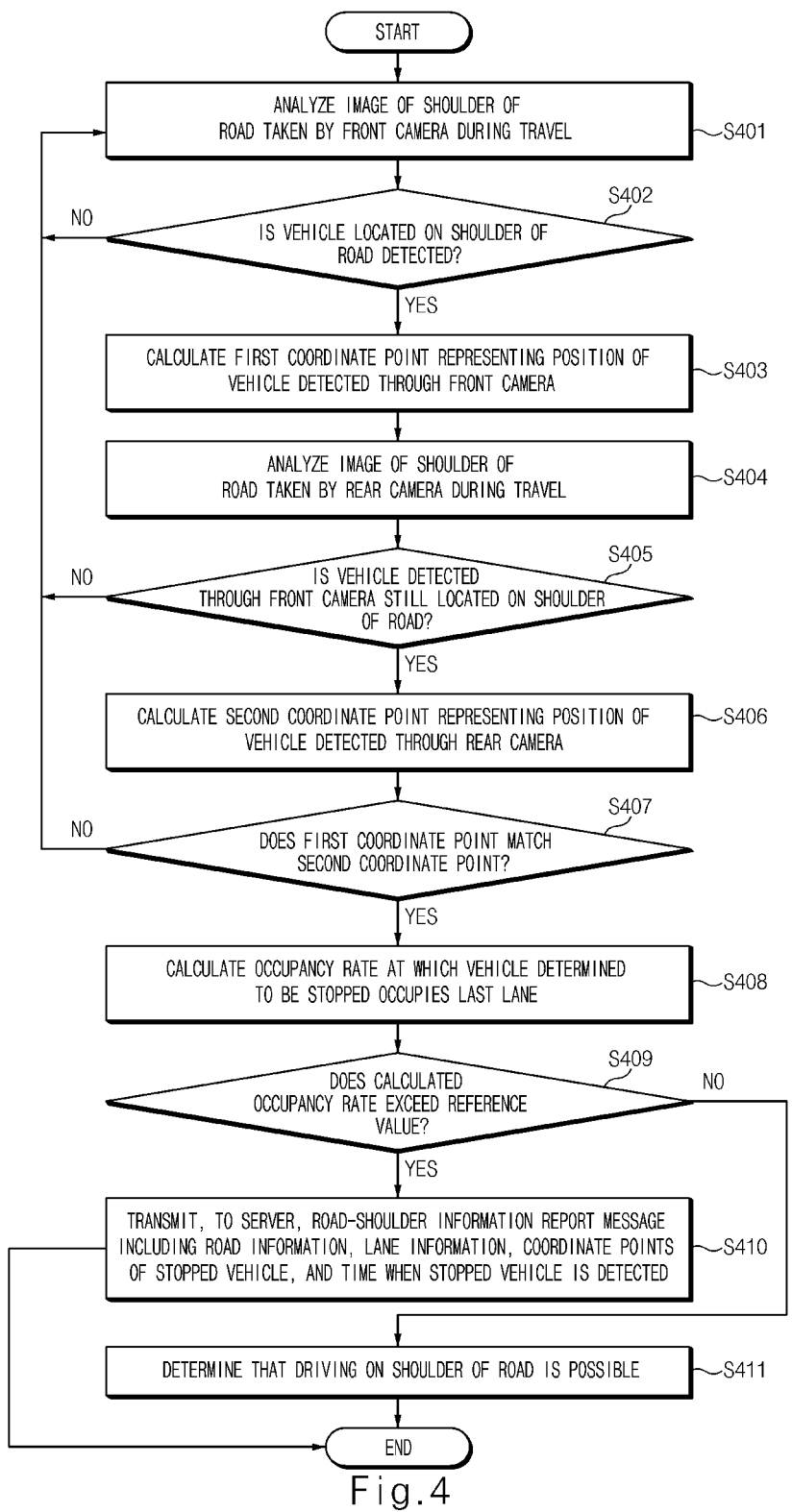
FIG. 4 is a flowchart illustrating a method of determining a road-shoulder parking/stopping state in a CCS vehicle according to an exemplary embodiment of the present disclosure.

FIG. 4 is a flowchart illustrating a method of determining a road-shoulder parking/stopping state in the CCS vehicle according to an exemplary embodiment of the present disclosure. Referring to FIG. 4, the CCS vehicle may be configured to analyze an image of the shoulder of a road captured by the front camera during travel of the CCS vehicle (S401).

When a vehicle located on the shoulder of the road is detected using the image analysis, the CCS vehicle may be configured to calculate a first coordinate point that represents the current position of the vehicle detected using the front camera (S402 and S403). In particular, the first coordinate point may be calculated as latitude and longitude. However, this is merely an exemplaiy embodiment. In another exemplary embodiment, the first coordinate point may be calculated as global positioning system (GPS) time.

When passing by the vehicle detected using the front camera, the CCS vehicle may be configured to analyze an image of the shoulder of the road captured by the rear camera while the CCS vehicle is being driven (S404). Through the analysis of the image captured by the rear camera, the CCS vehicle may be configured to determine whether the vehicle detected using the front camera is still located on the shoulder of the road (S405).

The CCS vehicle may be configured to calculate a second coordinate point representing the position of the vehicle detected using the rear camera and determine whether the first coordinate point matches the second coordinate point (S406 and S407). When the first coordinate point matches the second coordinate point, the CCS vehicle may be configured to determine that the detected vehicle is stopped on the shoulder of the road. In response to determining that the first coordinate point and the second coordinate point match each other, the CCS vehicle may be configured to calculate an occupancy rate at which the vehicle determined to be stopped on the shoulder of the road occupies the last lane (S408).

The CCS vehicle may be configured to determine whether the calculated occupancy rate exceeds a predetermined reference value (S409). In response to determining that the calculated occupancy rate exceeds the reference value, the CCS vehicle may be configured to determine that the CCS vehicle is unable to travel on the shoulder of the corresponding section of the road. For example, the reference value may be, but is not limited to, about 30% and may be set differently based on design of a person skilled in the art. In response to determining in S409 that the calculated occupancy rate exceeds the reference value, the CCS vehicle may be configured to generate and transmit a road-shoulder information report message to the CCS server (S410), in which the road-shoulder information report message includes road information, lane information, the coordinate points of the vehicle determined to be stopped on the shoulder of the road, the time when the vehicle determined to be stopped on the shoulder of the road is detected, and the like. In response to determining in S409 that the calculated occupancy rate does not exceed the reference value, the CCS vehicle may be configured to determine that the CCS vehicle is able to travel on the shoulder of the corresponding section of the road (S411).

Figure 5:
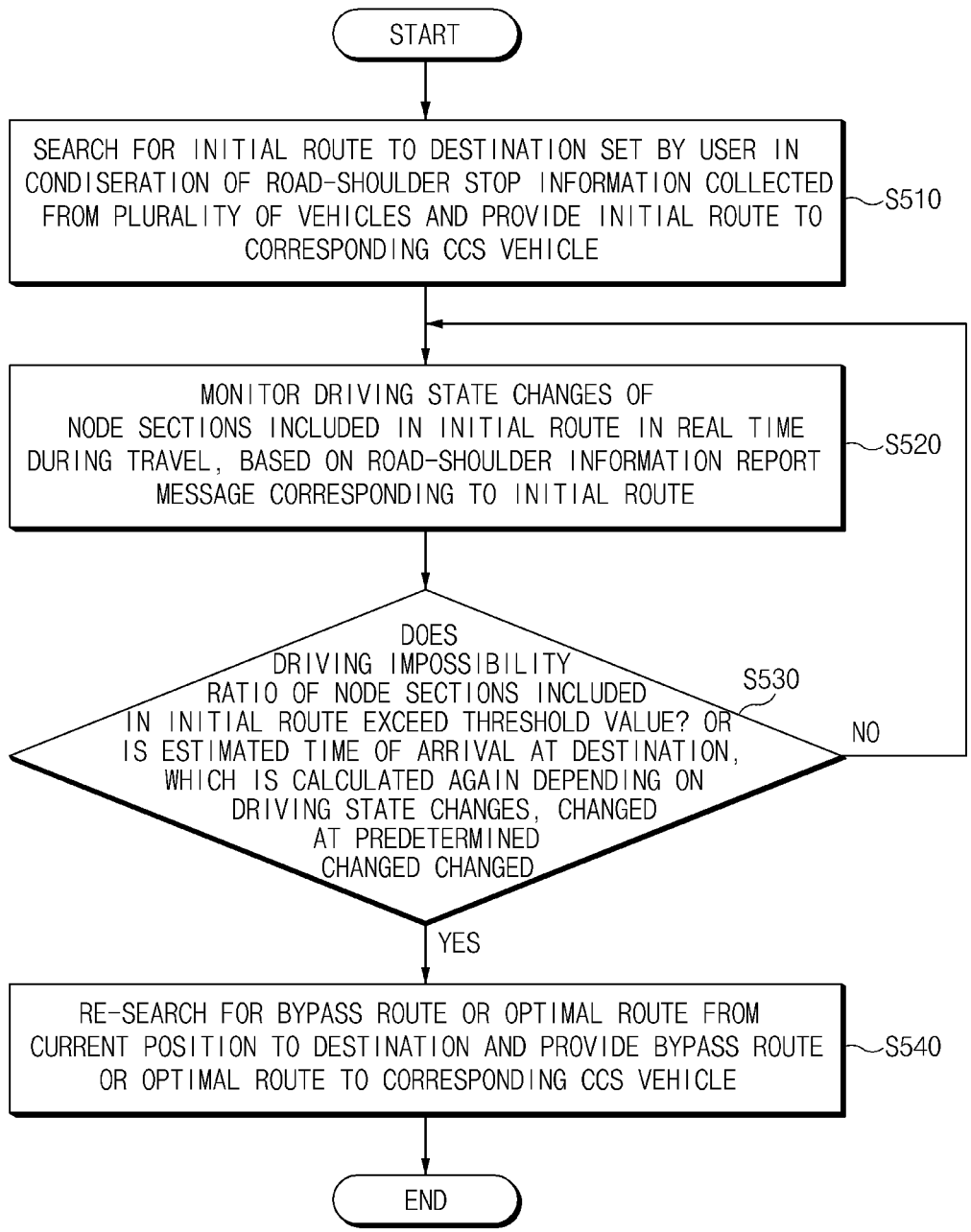
FIG. 5 is a flowchart illustrating a method of searching for a route using road-shoulder parking state information in a CCS server according to an exemplary embodiment of the present disclosure.

FIG. 5 is a flowchart illustrating a method of searching for a route using road-shoulder parking state information in the CCS server according to an exemplary embodiment of the present disclosure. The method described herein may be executed by a specifically programmed controller. Referring to FIG. 5, considering road-shoulder stop information collected from a plurality of vehicles, the CCS server may be configured to search for an initial route to a destination set by a user and provide the initial route to a corresponding CCS vehicle (S510).

During operation of the CCS vehicle (e.g., while the vehicle is being driven), the CCS server may be configured to monitor, in real time, driving state changes of node sections included in the initial route, based on a road-shoulder information report message collected from the plurality of vehicles in response to the initial route (S520). The CCS server may be configured to determine whether a driving impossibility ratio of the node sections included in the initial route exceeds a threshold value or estimated time of arrival at the destination that is calculated again based on the driving state changes is changed at a predetermined ratio or more (S530). In response to determining that the driving impossibility ratio exceeds the threshold value or the estimated time of arrival is changed at the predetermined ratio or greater, the CCS server may be configured to re-search for a bypass route or an optimal route from the current position to the destination again and provide the bypass route or the optimal route to the corresponding CCS vehicle (S540).

Figure 6:
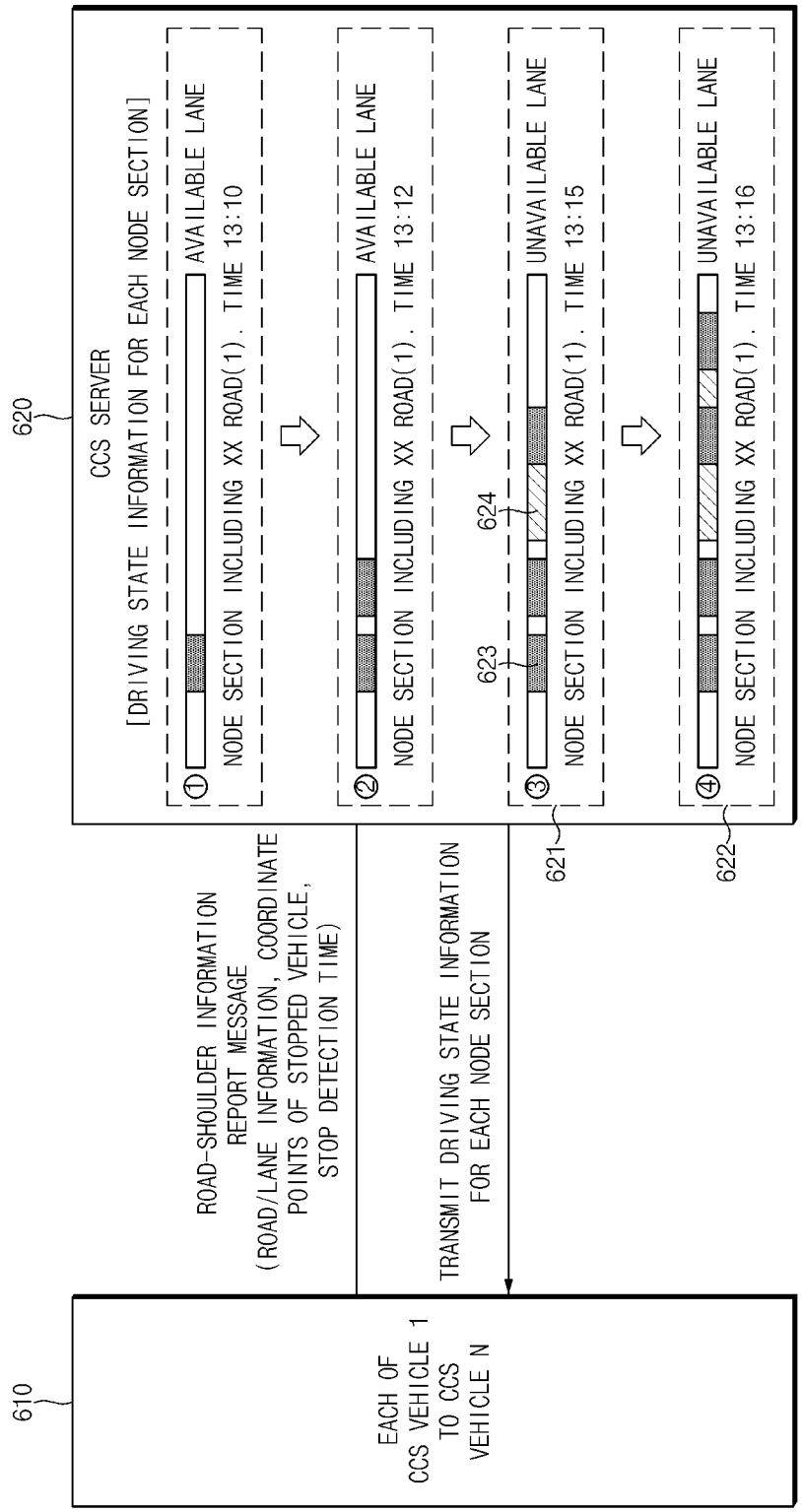
FIG. 6 is a view illustrating a driving state information update procedure for each node section in the CCS server according to an exemplary embodiment of the present disclosure.

FIG. 6 is a view illustrating a driving state information update procedure for each node section in the CCS server according to an exemplary embodiment of the present disclosure. Referring to FIG. 6, each of CCS vehicle 1 to CCS vehicle N 610 may be configured to identify a vehicle parked/stopped on the shoulder of a road by analyzing images captured by front/rear cameras and may be configured to transmit, to a CCS server 620 via a wireless communication network, a road-shoulder information report message including information about the identified parked/stopped vehicle.

Particularly, a colored rectangle 623 represents the road-shoulder information report message transmitted from each vehicle, and a hatched rectangle 624 represents a case where the road-shoulder information report messages transmitted from the vehicles overlap in a specific section. The CCS server 620 may be configured to monitor a driving state for each node section in real time, based on the road-shoulder information report message and transmit, to the corresponding vehicle, driving state information of a node section included in a driving route set for each vehicle. When the driving state of the corresponding node section is changed from a driving possibility state to a driving impossibility state or from a driving impossibility state to a driving possibility state, the CCS server 620 may be configured to re-search for a driving route for the corresponding vehicle.

In an exemplary embodiment, when a predetermined number or more of vehicles (e.g., about 10 or more vehicles) are stopped on the shoulder of the road at a predetermined interval (e.g., about 10 meters or less) in a first node section as indicated by reference numeral 621, the CCS server 620 may be configured to determine that smooth driving is impossible due to a narrow distance between the vehicles stopped on the shoulder of the road and accordingly may be configured to determine the driving state of the corresponding node section to be a driving impossibility state or a driving impossibility lane. Particularly, it should be noted that the predetermined interval and the predetermined number may be set differently by a person skilled in the art in consideration of the length of the corresponding node section, the number of traffic lights installed in the corresponding node section, the speed limit, the traffic, and the like.

Moreover, when the ratio of sections in which driving on the shoulder is difficult due to the vehicles stopped on the shoulder in the first node section exceeds a predetermined ratio (e.g., about 80%) as indicated by reference numeral 622, the CCS server 620 may be configured to determine the corresponding node section to be a driving impossibility state or a driving impossibility lane. The CCS server 620 according to the embodiment may be configured to provide, to the corresponding vehicle in real time, information about a node section in which a driving state is changed, among node sections included in a preset driving route.

When a predetermined number or more of node sections among node sections included in the driving route of the corresponding vehicle are in a driving impossibility state, the CCS server 620 according to the exemplaiy embodiment may be configured to re-search for a driving route for the corresponding vehicle. When driving states of node sections included in the driving route of the corresponding vehicle are changed, the CCS server 620 according to the exemplaiy embodiment may be configured to calculate time of arrival at a destination again based on the changed driving state information, and when the ratio at which the time of arrival at the destination is changed is greater than or equal to a predetermined reference value, the CCS server 620 may be configured to re-search for a driving route for the corresponding vehicle and provide the driving route.

Route search logic based on information about a road-shoulder parking/stopping state may be controlled to operate by reflecting only information collected in a radius range within predetermined driving time (e.g., about 30 minutes) relative to the current position of the corresponding vehicle. This is because road-shoulder parking/stopping state information collected at a distance exceeding 30 minutes has a high possibility that a parking/stopping state is changed when the corresponding vehicle moves to point where the corresponding information is collected.

The CCS server 620 according to the exemplary embodiment may be configured to transmit, to a vehicle traveling on the shoulder, a predetermined warning alarm message before the vehicle reaches a road-shoulder driving impossibility section, thereby notifying the vehicle that the last or outermost lane is in a driving impossibility state due to parking/stopping on the shoulder. This may allow the driver to move the vehicle into an available driving lane.

The operations of the method or the algorithm described in connection with the exemplary embodiments disclosed herein may be embodied directly in hardware or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, or a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

As described above, according to the exemplary embodiments, the present disclosure has an advantage of providing the route search method and system using road-shoulder parking state information. Furthermore, the present disclosure has an advantage of providing the route search method and system using road-shoulder parking state information, in which the method and system determines a lane state based on information about vehicles parked on the shoulder of a road and searches for an optimal route based on an outcome of the determination, the information being collected through the vehicle camera during travel.

Moreover, the present disclosure has an advantage of searching for a more accurate optimal route based on information about vehicles parked on the shoulder of a road, the information being collected through the camera of the Connected Car Service (CCS) vehicle that travels. In addition, the present disclosure may provide various effects that are directly or indirectly recognized.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the exemplary embodiments. The scope of the present disclosure should be construed on the basis of the accompanying claims, and all the technical ideas within the scope equivalent to the claims should be included in the scope of the present disclosure.

What is claimed is:

1. A method for searching for a route using road-shoulder parking state information in a vehicle operating in conjunction with a server via a wireless communication network, the method comprising:

identifying, by a controller, at least one vehicle stopped on a shoulder of a road by analyzing an image captured by a camera while the vehicle is being driven;

determining, by the controller, the at least vehicle to be reported as being stopped on the shoulder of the road among the identified vehicles stopped on the shoulder of the road; and generating, by the controller, a road-shoulder stop report message corresponding to the determined at least one vehicle to be reported as being stopped on the shoulder of the road, and transmitting the road-shoulder stop report message to the server, wherein the identifying of the vehicles stopped on the shoulder of the road includes:
  detecting, by the controller, the at least one vehicle stopped on a left or right shoulder of the road by analyzing an image captured by a front camera and calculating a first coordinate point representing a position of the detected vehicle;
  calculating, by the controller, a second coordinate point representing a position of the detected vehicle by analyzing an image captured by a rear camera; and
  determining, by the controller, the at least one vehicle to be stopped on the shoulder of the road by comparing the first coordinate point and the second coordinate point,
  wherein the determining of the at least one vehicle stopped on the shoulder of the road by comparing the first coordinate point and the second coordinate point includes:
    determining, by the controller, the detected vehicle to be the vehicle stopped on the shoulder of the road, when the first coordinate point and the second coordinate point match each other; and
    determining the detected vehicle to be traveling on the shoulder of the road, when the first coordinate point and the second coordinate point do not match each other,
  wherein the determining of the at least one vehicle to be reported as being stopped on the shoulder of the road includes:
    calculating, by the controller, an occupancy rate at which the at least one vehicle determined to be stopped on the shoulder of the road occupies an outermost lane; and
    determining, by the controller, the at least one vehicle to be reported as being stopped on the shoulder of the road by comparing the calculated occupancy rate and a predetermined reference value.

2. The method of claim 1, wherein the determining of the at least one vehicle to be reported as being stopped on the shoulder of the road by comparing the calculated occupancy rate and the predetermined reference value includes: determining, by the controller, a corresponding vehicle stopped on the shoulder of the road to be the at least one vehicle to be reported as being stopped on the shoulder of the road, when the calculated occupancy rate is greater than or equal to the reference value; and excluding, by the controller, the corresponding vehicle stopped on the shoulder of the road from the at least one vehicle to be reported as being stopped on the shoulder of the road, when the calculated occupancy rate is less than the reference value.

3. The method of claim 2, wherein the road-shoulder stop report message includes at least one of the group consisting of: information regarding time when stop is identified, road information, lane information, and position information that corresponds to the determined vehicle to be reported as being stopped on the shoulder of the road.

4. The method of claim 1, wherein based on the road-shoulder stop report message collected from a different vehicle, the server is configured to monitor a driving state change for each node section included in an initial route found to correspond to the at least one vehicle, and based on an outcome of the monitoring, the server is configured to determine whether to re-search for a route for the at least one vehicle.

5. The method of claim 4, wherein the server is configured to determine that re-search for a route for the at least one vehicle is required, in response to determining that a driving impossibility ratio of the node sections included in the initial route exceeds a predetermined threshold value, or estimated time of arrival at a destination that is calculated again based on the driving state change is changed at a predetermined ratio or more.

6. The method of claim 5, wherein the server is configured to monitor a driving state change for each corresponding node section using a road-shoulder stop report message collected from the different vehicle within a predetermined driving time radius at the current position of the at least one vehicle.

7. A vehicle, comprising:
  a camera configured to capture an image around the vehicle;
  a processor; and
  a non-transitory storage medium containing program instructions that, when executed by the processor, causes the autonomous driving control apparatus to:
  identify at least one vehicle stopped on a shoulder of a road by analyzing an image captured by the camera while the vehicle is being driven;
  calculate an occupancy rate at which the identified vehicle stopped on the shoulder of the road occupies an outermost lane;
  determine the at least one vehicle to be reported as being stopped on the shoulder of the road, based on the calculated occupancy rate;
  generate a road-shoulder stop report message corresponding to the determined at least one vehicle to be reported as being stopped on the shoulder of the road; and
  transmit the road-shoulder stop report message to a server via a wireless communication network,
  wherein the camera includes a front camera and a rear camera, and wherein the program instructions when executed are configured to:
  detect the at least one vehicle stopped on a left or right shoulder of the road by analyzing an image captured by the front camera and calculate a first coordinate point representing a position of the detected at least one vehicle;
  calculate a second coordinate point representing a position of the detected at least one vehicle by analyzing an image captured by the rear camera; and
  determine a vehicle stopped on the shoulder of the road by comparing the first coordinate point and the second coordinate point, and
  wherein the program instructions when executed are configured to:
  determine the detected at least one vehicle to be stopped on the shoulder of the road, when the first coordinate point and the second coordinate point match each other; and
  determine the detected at least one vehicle to be traveling on the shoulder of the road, when the first coordinate point and the second coordinate point do not match each other, and wherein the program instructions when executed are configured to:
  determine the corresponding vehicle to be reported as being stopped on the shoulder of the road, when the occupancy rate calculated to correspond to the at least one vehicle determined to be stopped on the shoulder of the road is greater than or equal to a predetermined reference value; and
  exclude the corresponding vehicle from being reported as being stopped on the shoulder of the road when the occupancy rate is less than the reference value.

8. The vehicle of claim 7, wherein the road-shoulder stop report message includes at least one of the group consisting of: information regarding time when stop is identified, road information, lane information, or position information that corresponds to the determined vehicle to be reported as being stopped on the shoulder of the road.

9. The vehicle of claim 7, wherein based on the road-shoulder stop report message collected from a different vehicle, the server is configured to monitor a driving state change for each node section included in an initial route found to correspond to the at least one vehicle, and based on an outcome of the monitoring, the server is configured to determine whether to re-search for a route for the at least one vehicle.

10. The vehicle of claim 9, wherein the server is configured to determine that research for a route for the vehicle is required, in response to determining that a driving impossibility ratio of the node sections included in the initial route exceeds a predetermined threshold value, or estimated time of arrival at a destination that is calculated again based on the driving state change is changed at a predetermined ratio or more.

* * * * *